March 4, 1924. 1,485,984
J. D. JONES
SELF OILING HUB BEARING
Filed June 30, 1923   3 Sheets-Sheet 1

Inventor
John D. Jones
Eugene C. Brown
Attorney

March 4, 1924. 1,485,984
J. D. JONES
SELF OILING HUB BEARING
Filed June 30, 1923 3 Sheets-Sheet 2

Inventor
John D. Jones
Eugene E. Brown
Attorney.

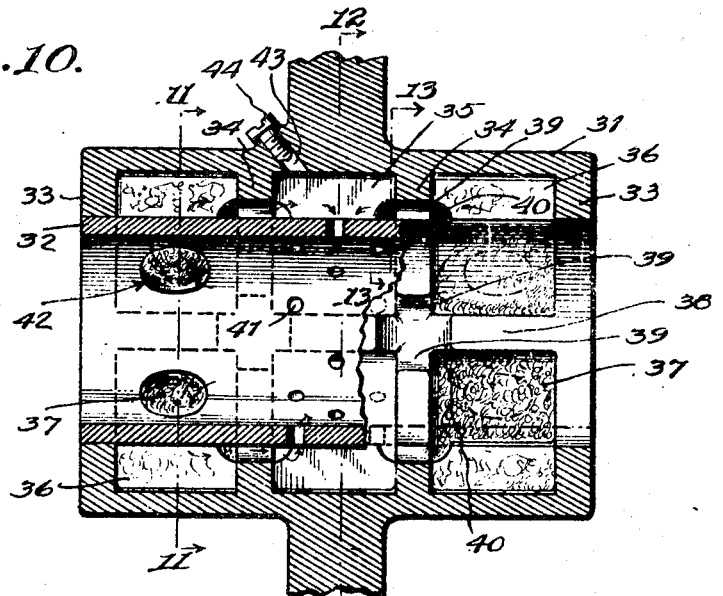
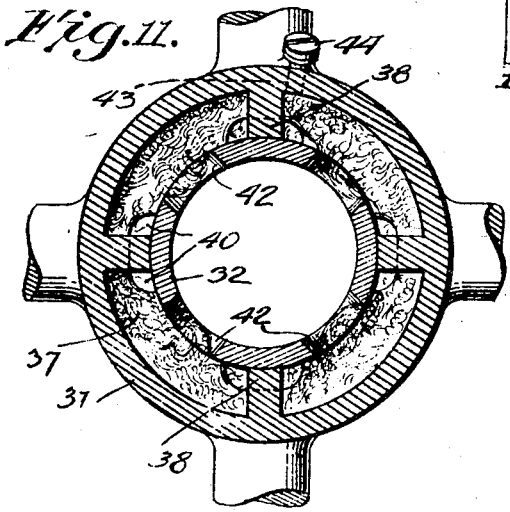
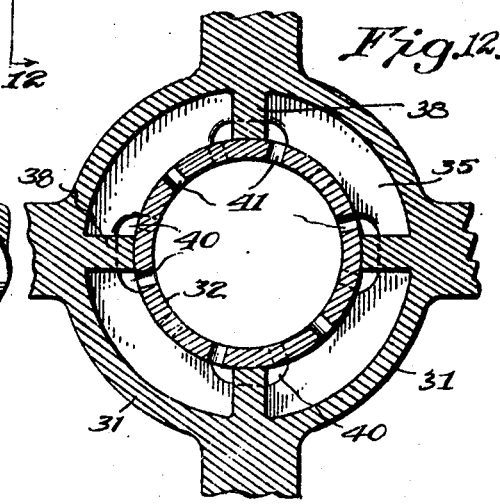
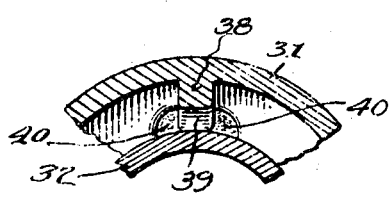

Patented Mar. 4, 1924.

1,485,984

UNITED STATES PATENT OFFICE.

JOHN D. JONES, OF WALLA WALLA, WASHINGTON.

SELF-OILING HUB BEARING.

Application filed June 30, 1923. Serial No. 648,773.

*To all whom it may concern:*

Be it known that I, JOHN D. JONES, a citizen of the United States, residing at Walla Walla, in the county of Walla Walla and State of Washington, have invented certain new and useful Improvements in Self-Oiling Hub Bearings, of which the following is a specification.

This invention relates to self oiling bearings for shaft bearings, pulleys, hubs and the like.

An object of my invention is to provide an improved practically dustproof bearing in which there is a constant circulation of oil along the bearing surfaces, and which is automatically filtered as it is returned to the oil reservoir within the casing of the bearing.

A further object of the invention is to provide a bearing embodying a rotating oil chamber with means for employing the "lag" of the oil to bring the oil into lubricating relation to the journal.

Further object of the invention is to provide a bearing having an annular or cylindrical bearing sleeve with an oil chamber positioned externally of the sleeve and means within the oil chamber so that as the chamber and bearing rotates causes the oil to flow circumferentially about the bearing sleeve and into position to enter the bearing sleeve and lubricate the bearing.

With these and other objects in view, as will become hereinafter apparent, the invention will now be described, reference being had to the accompanying drawings, in which:—

Fig. 10 is a longitudinal section through a modified form of the device disclosing the same with the hub of a wheel constituting the outer casing.

Fig. 11 is a detail view on the lines 11—11 of Fig. 10.

Fig. 12 is a detail view on the lines 12—12 of Fig. 10.

Fig. 13 is a detail section on the lines 13—13 of Fig. 10.

Figure 1:
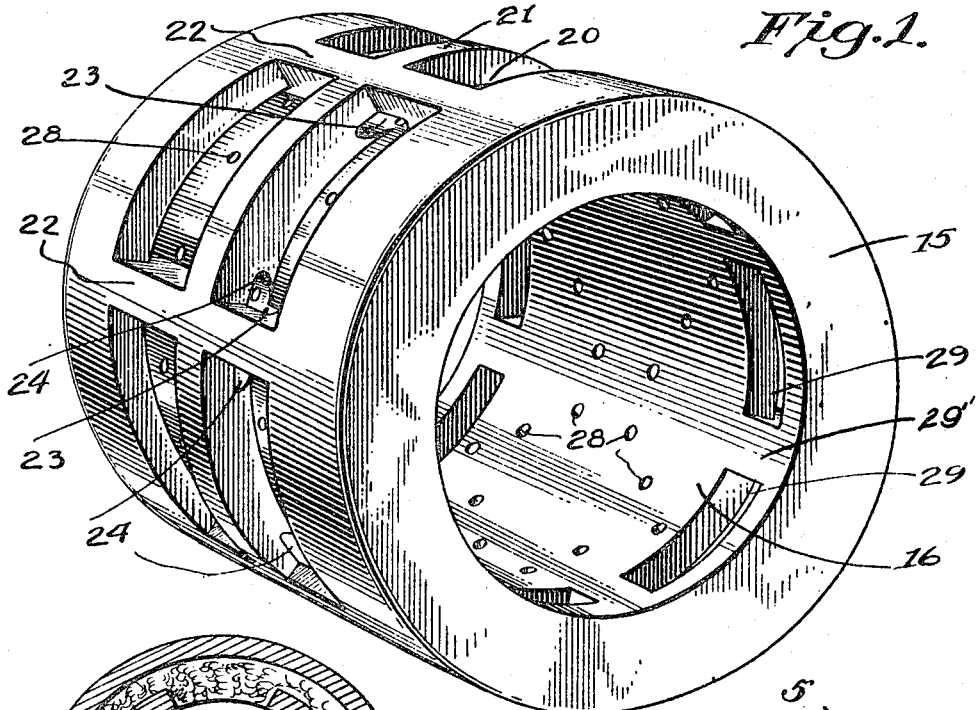
Fig. 1 is a perspective view of one form of the improved bearing.
Figures 3, 4:
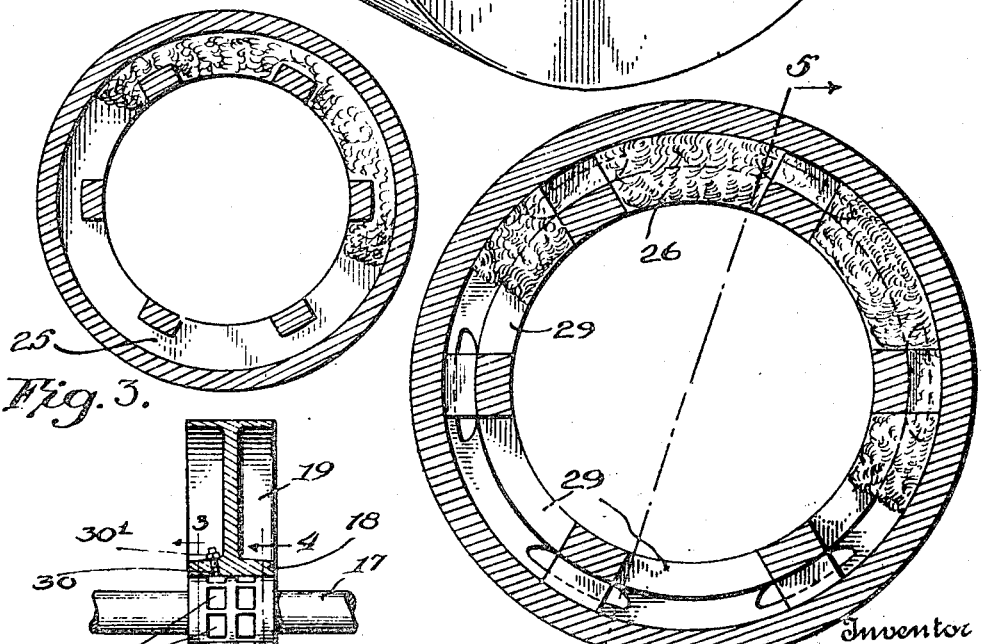
Fig. 3 is an enlarged detail section on the line 3—3 of Fig. 2.
Fig. 4 is a still further enlarged section on the line 4—4 of Figure 2.
Figure 2:
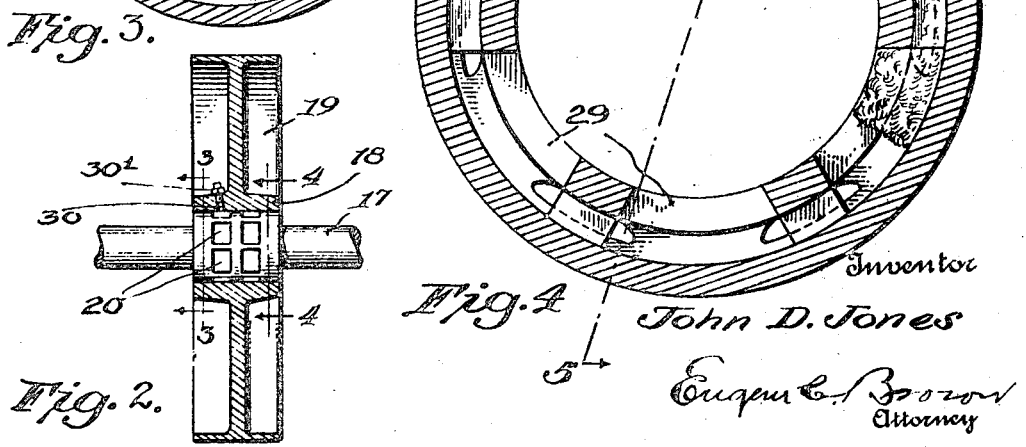
Fig. 2 is a view partly in section showing the application of the bearing to a belt pulley and shaft.
Figure 5:
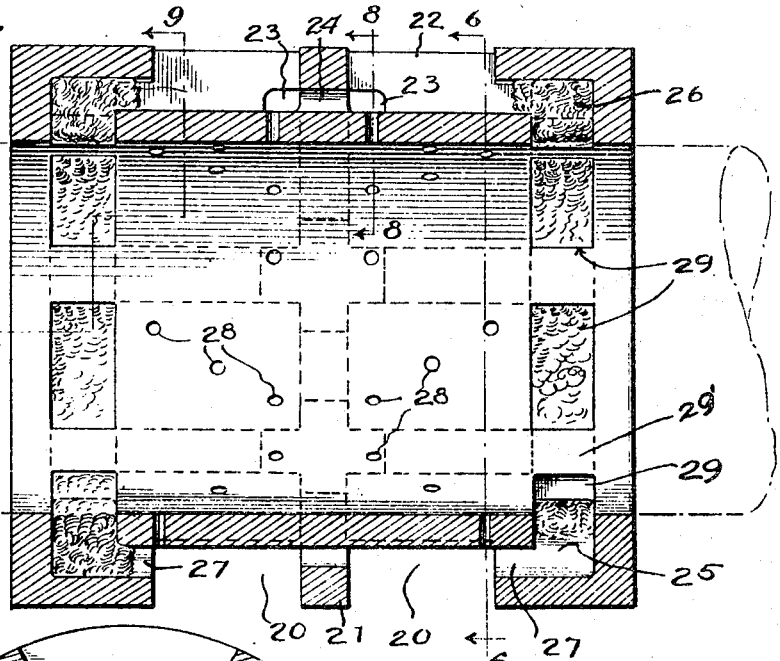
Fig. 5 is a section on the line 5—5 of Fig. 4.
Figure 6:
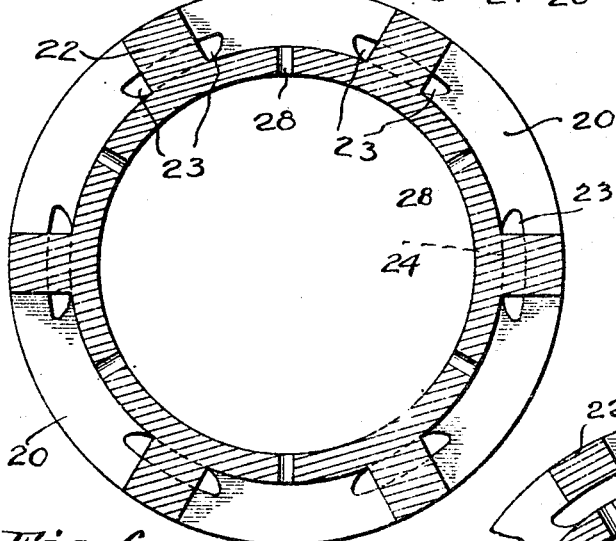
Fig. 6 is a section on the line 6—6 of Fig. 5.
Figure 7:
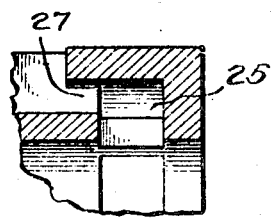
Fig. 7 is a detail section taken radially through a portion of one end of the bearing and disclosing the communication between the oil reservoir or chamber and the packing recess.
Figure 8:
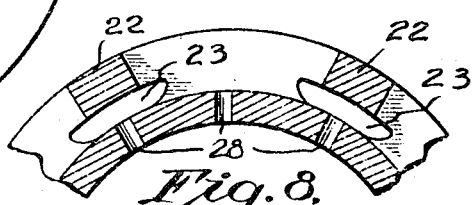
Fig. 8 is a detail section on the line 8—8 of Fig. 5.
Figure 9:
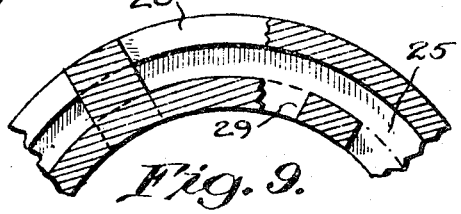
Fig. 9 is a detail section on the line 9—9 of Fig. 5.

The bearing in the form shown in Figures 1 to 9 inclusive, is preferably made of a single integral casing 15 of hollow cylindrical form having an interior bore 16 of suitable size to receive the shaft 17 upon which it is to be fitted. The exterior of this bearing is also of cylindrical form, and is of proper size to fit air-tight within the hub 18 of a pulley 19 or other like rotating element. Extending peripherally around the exterior of the bearing is one or more series of spaced pockets 20 constituting oil reservoirs, in the present instance there being for example only two of these series of pockets separated from each other by a peripheral rib 21, the several pockets of the series being defined from each other by longitudinal ribs 22 spaced circumferentially about the bearing. At some point or points in the ribs 22, as for instance at the junction of the rib 21 with the several ribs 22, there is provided in each of the ribs 22 an oil duct 23, and for convenience of machining will be continued by the openings 24, in the ribs 21. By this arrangement each pocket of a series communicates with the adjacent pockets of that series, at a point contiguous to the bearing surface and can also communicate freely with the adjacent pockets of the other series if any. In the end portions of the bearing, there are provided annular channels 25 for the reception of a suitable fibrous and absorbent packing material 26, these channels or recesses communicating with the pockets 20 by means of ports 27. Leading from the pockets 20 to the interior of the bearing are perforations 28 forming oil inlet ducts, some of which at least will coincide with the ducts 23 while from the recess 25 there lead to the interior of the bearing larger apertures 29 through which the packing material 26 protrudes, so as to bear against the shaft 17. These pockets 29, are separated and defined by bridges 29' formed upon the same circle and as continuations of the cylinder 16. In the hub is formed an oil inlet 30 provided with a suitable closure 30', and this oil inlet communicates with one of the pockets 20 so that by removing the closure 30', the bearing pockets 20 may be filled with oil. It is to be understood that the hub fits so closely on the bearing that the joint is oil and airtight.

In operation, oil is supplied through the oil opening 30, to the oil chamber, comprising the pockets 20. The dividing rib 21, between the pockets 20, is merely for reinforcing and forms no part of the invention otherwise. The passages 23 and 24, are, as will be noted, located contiguous to the sleeve member which forms the bearing surface upon its interior. It is well known that by reason of the viscosity of the oil it tends to lag behind the rotation of the chamber and to therefore flow from one chamber to another through the passages 23. This forces the oil contiguous to the sleeve and overcomes the tendency to seek the outer area of the pockets through centrifugal action.

Some of the perforations 28, as will be noted are located at these passages 23, so that as the oil flows through these passages 23, it is drawn through the perforations 28, into the bearing, again by reason of its viscosity. The withdrawing of oil from the air-tight pockets or compartments causes attenuation of the air therein, which tends to draw the oil back through the filtering matter 26, into the oil compartments, whereby a continual circulation of oil is provided entering midway of the bearing moving outwardly towards the outer ends of the bearing and again drawn into the chamber through the filtering matter 26.

It will be observed that in this construction, the ribs 22 and the end portions of the bearing form parts of a cylindrical surface common to all of these parts, so that the bearing is supported within the hub not only circumferentially but longitudinally throughout its length, this longitudinal support being effected by the ribs 22, which are in air and oil excluding engagement with the hub.

In the form shown in Figures 10 to 13 inclusive, the bearing consists of two parts, the exterior casing or housing 31 which has been here disclosed as the hub of a pulley or the like, and an interior bushing 32. The casing or housing has on its interior at its ends inwardly projecting annular ribs 33, and between these ribs similar intermediate ribs 34 may be used as reinforcing, so that the housing in this instance illustrated is divided at its interior surface into an annular central oil chamber 35 and terminal packing receiving recesses 36 wherein is held a suitable fibrous and absorbent packing 37, it being understood that the invention is not limited to a single oil chamber but is capable of employing a plurality of such chambers as in the type shown at Figures 1 to 9 inclusive. Furthermore, this casing has at its interior longitudinally extending circumferentially spaced ribs 38, and it will be observed that these ribs divide the oil chamber or chambers into annular series of pockets. It is further to be noted that the top or inner surface of the ribs 38 are so positioned that they form portions of a cylindrical surface, so that the bushing 32 which is fitted inside of the casing 31 is in air-tight relation with the end ribs 33, and longitudinal ribs 38. However, at the point of junction of the ribs 38 with the intermediate ribs 34 there are provided in the ribs 34 oil passages 39, and in the ribs 38 similar oil passages 40 so that communication is established between the recesses 36 and several compartments 35 of the central oil chamber.

The bushing 32 is a hollow cylindrical member of such size exteriorly as to fit air-tight within the casing and prevent the escape of oil therefrom except through the small oil passages or ducts 41, some of which coincide with the passages 39 and 40 afford communication from the oil chamber to the interior of the bushing and enable oil to be fed to the shaft on which the bearing is placed, and through larger apertures 42 opening from the recesses to the interior of the bushing so that the packing may protrude therethrough and bear against the shaft in the bearing. A suitable filling opening 43 is provided which is preferably closed by a plug 44 under normal condition.

With the bearings constructed in this manner, the oil flow will take place precisely as previously described in the form illustrated in Figures 1 to 9 inclusive.

I have described in detail the particular constructions illustrated in the accompanying drawings for the purpose of clearly disclosing my invention, but it will be obvious to engineers and others skilled in the art that various modifications and changes can be made in such construction without departing from the essential features of the invention, as for instance the showing of the several oil chambers, pockets, compartments, ducts, perforations, the like may be varied by increasing or decreasing the number, the essence being that baffles extend longitudinally of the bearing in parallelism with the sides with the ducts forming communication between the compartments or pockets, causes the oil to flow from one compartment to another through these ducts which communicate by perforations with the lubricating surface the flow being insured by the tendency of the oil to lag relative to the rotation of the bearing.

I claim:

1. A self oiling bearing of hollow cylindrical form and having a centrally disposed annular oil chamber and annular packing receiving recesses at its ends in communication with said chamber, said bearing having a series of longitudinally extending ribs arranged across the oil chamber to divide the same into an annular series of pockets, said bearing having small apertures leading from its interior to the oil chamber and larger packing receiving apertures leading from the interior to said recesses.

2. A self oiling bearing of hollow cylindrical form and having a centrally disposed annular oil chamber and annular packing receiving recesses at its end in communication with said chamber, said bearing having a series of longitudinally extending ribs arranged across the oil chamber to divide the same into an annular series of pockets, said bearing having small apertures leading from its interior to the oil chamber and larger packing receiving apertures leading from the interior to said recesses, said bearing further having a central peripheral rib dividing the oil chamber into two longitudinally disposed portions, said rib being provided with oil channels affording communication between the portions of the oil chamber, said channels being located at the junction of the longitudinal and central ribs.

3. A self oiling bearing comprising a casing or housing having annular packing or filtering recesses adjacent each end and an oil receiving chamber between said recesses, said recesses being divided into annular series of pockets by ribs extending from end to end of the casing, said recesses being in communication with said chamber by oil channels and the pockets in the several series being in communication with each other by oil channels, and a tubular bushing secured within said casing and having small apertures forming oil inlet ducts connecting with said oil chamber and provided with larger apertures opening into said recesses adapted to permit waste within said recesses to protrude therethrough.

4. A self oiling bearing comprising a casing or housing having annular packing or filtering recesses adjacent each end and an oil receiving chamber between said recesses, said recesses being divided into annular series of pockets by ribs extending from end to end of the casing, said recesses being in communication with said chamber by oil channels and the pockets in the several series being in communication with each other by oil channels, a tubular bushing secured within said casing and having small apertures forming oil inlet ducts connecting with said oil chamber and provided with larger apertures opening into said recesses, a shaft within said bushing and rotatable with respect thereto, and absorbent fibrous material packed within said recesses and protruding through said larger apertures against said shaft, whereby oil drawn through the small apertures and moving outwardly along the shaft is taken up by said absorbent material and is returned to the oil chamber through said channels by the reduced pressure existing in the chamber by reason of the oil withdrawn through the small apertures.

5. A self oiling bearing comprising an annular casing or housing having on its interior at its ends inwardly projecting annular ribs and similar intermediate ribs spaced from the end ribs whereby to divide the interior surface into an annular central oil chamber and terminal packing receiving recesses, said casing further having on its interior longitudinally extending circumferentially spaced ribs, all of said ribs being of the same height and having their top surfaces curved to form portions of a cylindrical surface common to all of the ribs, said longitudinal and intermediate ribs being provided at their junctions with notches constituting oil channels, and a tubular bushing secured within said casing and having small apertures forming oil inlet ducts connecting with said oil chamber and provided with larger apertures opening into said recesses adapted to permit waste within said recesses to protrude therethrough.

6. A self oiling bearing comprising an annular casing or housing having on its interior at its ends inwardly projecting annular ribs and similar intermediate ribs spaced from the end ribs whereby to divide the interior surface into an annular central oil chamber and terminal packing receiving recesses, said casing further having on its interior longitudinally extending circumferentially spaced ribs, all of said ribs being of the same heght and having their top surfaces curved to form portions of a cylindrical surface common to all of the ribs, said longitudinal and intermediate ribs being provided at their junctions with notches constituting oil channels, a tubular bushing secured within said casing and having small apertures forming oil inlet ducts connecting with said oil chamber and provided with larger apertures opening into said recesses, a shaft within said bushing and rotatable with respect thereto, and absorbent fibrous material packed within said recesses and protruding through said larger apertures against said shaft, whereby oil drawn through the small apertures and moving outwardly along the shaft is taken up by said absorbent material and is returned to the oil chamber through said channels by the reduced pressure existing in the chamber by reason of the oil withdrawn through the small apertures.

7. A self oiling bearing comprising a cylindrical part the interior of which is the journaling surface and the exterior of which forms one wall of a chamber surrounding said cylinder and baffles disposed longitudinally in said chamber having communicating passages adjacent to said cylinder employing the tendency of the oil to lag, to pass through said passages in juxtaposition to the journaling surface.

8. A self oiling bearing comprising an annular oil chamber the inner wall of which is composed of a cylindrical sleeve whose interior forms the bearing surface, longitudinal baffles formed in said chamber and provided with passages employing the tendency of oil to lag, to pass from one compartment to another, said sleeve being provided with perforations coinciding with the said passages.

9. A self oiling bearing comprising an air-tight annular chamber the inner wall of which is the bearing sleeve, ribs formed in the chamber extending longitudinally relative to the bearing and provided with passages contiguous to the sleeve, said sleeve being provided with perforations coinciding with the passages and return passages from said sleeve to said oil chamber.

In testimony whereof I affix my signature.

JOHN D. JONES.